Aug. 5, 1930.   A. SCHUERGER   1,772,367
ROADWAY SANDER
Filed April 26, 1928
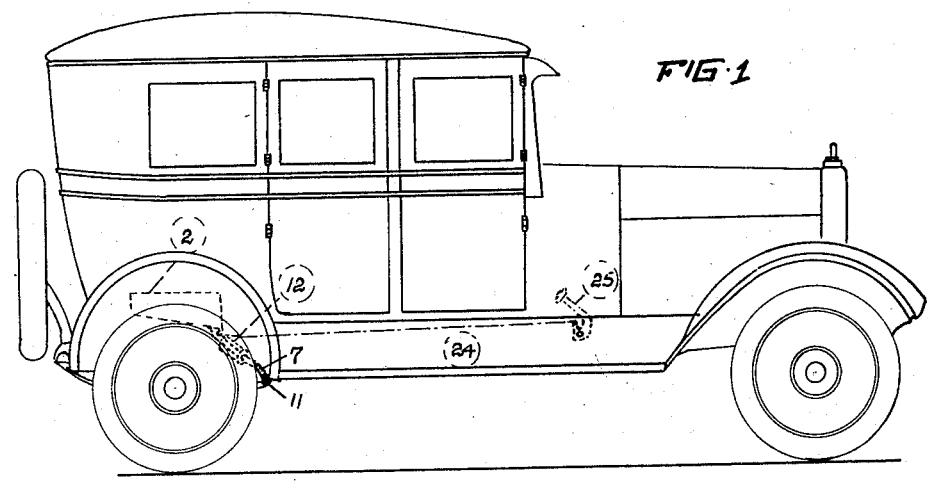
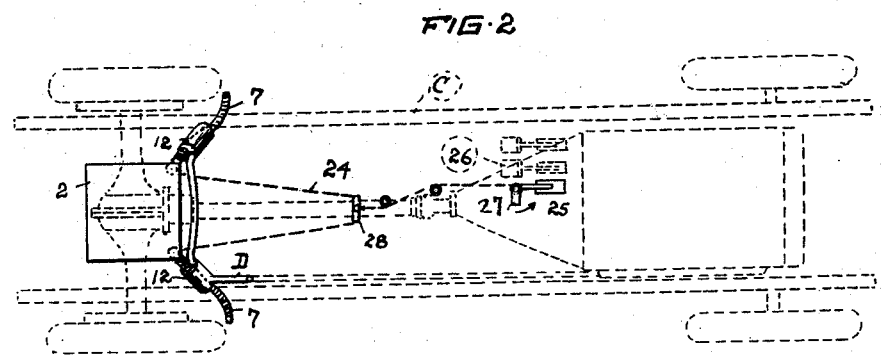
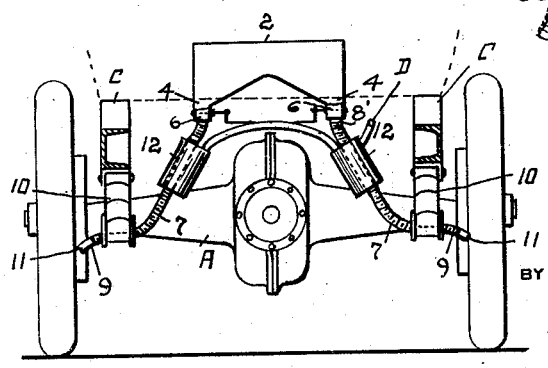
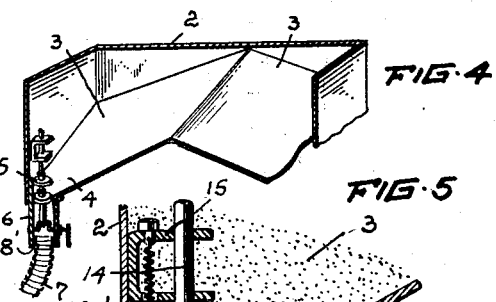
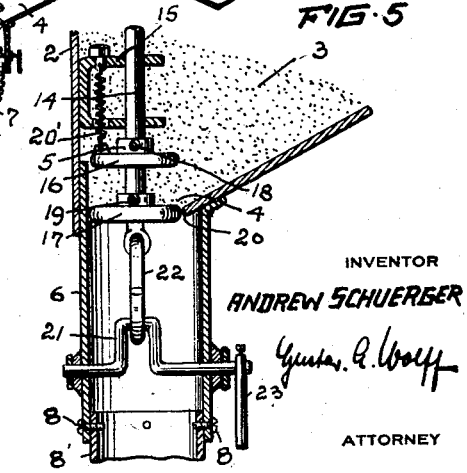
INVENTOR
ANDREW SCHUERGER
ATTORNEY Patented Aug. 5, 1930

1,772,367

UNITED STATES PATENT OFFICE

ANDREW SCHUERGER, OF CLEVELAND, OHIO

ROADWAY SANDER

Application filed April 26, 1928. Serial No. 272,924.

My invention relates to improvements in roadway sanders, and more particularly to roadway sanders for motor vehicles in which an anti-skidding material stored in a container upon the vehicle, is dispensed to the street in the path of the driving wheels, so that the tires contacting with said material are prevented from skidding.

The general object of my invention is to provide a simple and compact unit of such a sander adapted to be attached to any automobile, which unit according to my invention includes a container or hopper rigidly connected to the chassis of the vehicle and flexible dispensing tubes for the anti-skid material connected to said container and to the yieldingly supported rear axle of the vehicle or to its yielding supporting means close to said axle. Such an arrangement assures proper dispensing of the anti-skid material into the path of the driving wheels so that the sander will act properly under all conditions without necessitating extensive application of anti-skid material.
Another object of my invention is the heating of such flexible dispensing tubes, preferably by the exhaust gas of the engine of the motor vehicle.

It has already been proposed to heat the container of a roadway sanding device, but such container, generally arranged within the car, is not exposed to the open atmosphere, and therefore heating of the container will not prevent freezing and clogging up of elongated dispensing tubes openly exposed to the atmosphere and to splashes of water, dirt, or snow.

A still further object of my invention is a valve mechanism associated with the container adapted to automatically control the amount to be dispensed and adjustable to the special needs of any motor vehicle equipped with my roadway sander.

Still other objects of my invention will more readily be understood from the following description of my invention and the drawings forming part thereof, and are particularly pointed out in the claims.

In the accompanying drawing, Fig. 1 is a side view of an automobile showing in dotted lines the location of the sander and its operating mechanism. Fig. 2 is a plan view of the sander and operating mechanism, the outline of the automobile being shown in dotted lines. Fig. 3 is a sectional view through the frame chassis of an automobile showing a front view of the container or hopper of the sander, the flexible dispensing tubes connected with said hopper and the heating means for the flexible tubes. Fig. 4 is a perspective sectional view through the hopper and one of the outlets thereof; and Fig. 5 is an enlarged sectional view through the valve mechanism of the hopper.

The sheet metal container 2 of the sanding unit, directly supported on the chassis C is divided into two symmetrical hopper-like compartments 3, each of which includes an outlet 4 governed by a valve unit 5 within and above the outlet 4 of compartment 3.

Said valve unit 5 extends through outlet 4 into a tubular attachment 6 of circular cross-section rigidly connected to container 2 and elongated by a flexible metal or rubber tube 7 screw-connected therewith by means of screw members 8, so that one end 8' of said flexible tube 7 is rigidly connected to and supported by chassis C. The other end 9 of said flexible tube is so attached to spring 10 connecting rear axle A with chassis C that outlet 11 of tube 7 is approximately suspended in front of and directly above the path of the corresponding driving wheel. Such mounting of flexible tubes 7 permits oscillations of chassis C and thereby of container 2 with respect to rear axle A without changing the position of outlets 11 to the driving wheels so that both outlets 11 always dispense the anti-skid material exactly into the path of said wheels. To prevent freezing or clogging of said outlets 11 heating boxes 12 (heated by the exhaust gas) encircle tubes 7 and these boxes, one for each flexible tube 7, are preferably connected in series with the exhaust pipe D of the vehicle.

Now, referring to the valve or controlling unit 5 for the material to be dispensed, this unit comprises a valve stem 14 slidably guided by a U-shaped bracket 15 rigidly connected to the hopper-like compartment 3 of container 2, directly above outlet 4.

Valve stem 14 supports two round valve disks 16 and 17 adjustably secured to said stem by means of screw members 18 and 19, to permit adjusting of said valve disks 16 and 17 with respect to each other and to valve stem 14 for a purpose later to be described. A tension spring member 20' attached to disk 16 and bracket 15 yieldingly raises said disk 16 and stem 14 to such a position that disk 17 closes the circular outlet opening 20 of outlet 4 directly opposite tubular attachment 6. It will be noted that opening 20 is of smaller diameter than tubular attachment 5 to permit continuous discharge of the contents of compartment 3 (preferably sharp sand or crushed stone of granular characteristics) as soon as valve stem 14 and thereby disk 17 is lowered and that furthermore disk 16 also lowered by such action, tends to close opening 20. If disk 16 is so adjusted that a full throw of the valve aligns said disk with opening 20, to give the operator full control of the amount to be dispensed during operation of the valve unit 5, but by changing the relative position of disks 16 and 17 on stem 14 the valve may readily be adjusted to dispense the desired quantity necessary for the type of car to which the roadway sander is attached.

The shown operating means for the valve unit include a crank lever 21 linked by member 22 to valve stem 14, and said crank lever pivotally supported in attachment 6 is operatively connected over operating lever 23 and connecting rope 24 to a foot pedal 25 close to and aligned with the brake pedal 26 of the vehicle. Pedal 25 bears at its top portion a plate 27 of elongated form shiftable for engagement with brake pedal 26 to permit either independent activating of the sanding device or activating of said device by said brake pedal 26.

To secure simultaneous action of both valve units 5 I prefer the use of an equalizing bar 28 in the operating line between valve units 5 and operating lever 25.

What I claim, is:

1. A roadway sander adapted to be attached to a motor vehicle, comprising a sand container having symmetrically arranged outlets, valve means for each of said outlets, flexible dispensing tubes connected to said outlets of said container, and heating boxes for each of said flexible tubes adapted to be heated by the exhaust gas of a motor vehicle, each box encircling one of said tubes and said boxes being in series connected with each other.

2. A roadway sander adapted to be attached to a motor vehicle, comprising a sand container having two symmetrically arranged hopper compartments in the lower part thereof, a valved outlet for each of said hopper compartments, flexible dispensing tubes connected to each of said valved outlets and heating boxes encircling said flexible tubes and adapted to be heated by the exhaust gas of the motor vehicle.

3. A roadway sander, comprising a sand container having an outlet, valve means controlling said outlet, and flexible dispensing tubes connected to the outlet of said container, in combination with a motor vehicle having a frame, a rear axle and springs connecting said frame with said rear axle, said container being rigidly connected to the frame of said vehicle and the flexible tubes being connected to said rear axle of the vehicle.

4. A roadway sander, comprising a sand container, having two symmetrically arranged outlets at the bottom thereof, valve means for each of said outlets and flexible dispensing tubes connected to said outlets in combination with a motor vehicle having a frame, wheel supporting axles and springs connecting said axles with said frame, said container being rigidly supported by said frame and said flexible tubes being supported by said springs close to said axles and in approximate alignment with the path of wheels.

5. A roadway sander, comprising a sand container having symmetrically arranged outlets at the bottom thereof, valve means for each of said outlets, flexible dispensing tubes attached to said outlets, and heating boxes for each of said flexible tubes in combination with a motor vehicle having a frame, axles and spring means connecting said axles with said frame, said container being rigidly held by said frame, the free end of said flexible tubes being attached to said spring means and the heating boxes being heated by the exhaust gas of the motor vehicle.

6. A roadway sander, adapted to be attached to a motor vehicle, comprising a sand container, an outlet arranged at the bottom of said container, adjustable valve means attached to said container for controlling the amount of material to be dispensed therefrom, and a flexible dispensing tube connected to said outlet, said valve means for said outlet including a valve stem and two valve disks adjustably secured thereon, so that both disks alternately open and close such outlet during a single operation of said valve means.

7. A roadway sander, adapted to be attached to a motor vehicle, comprising a sand container having an outlet at the bottom thereof, valve means controlling said outlet, a flexible dispensing tube connected to said outlet of said container and heating boxes encircling said flexible tube adapted to be heated by the exhaust gas of the motor vehicle.

In testimony whereof I affix my signature.

ANDREW SCHUERGER.